(12) United States Patent
Chang et al.

(10) Patent No.: US 9,912,402 B2
(45) Date of Patent: Mar. 6, 2018

(54) SATELLITE RECEPTION ASSEMBLY INSTALLATION AND MAINTENANCE

(71) Applicant: MaxLinear, Inc., Carlsbad, CA (US)

(72) Inventors: Glenn Chang, Carlsbad, CA (US); Curtis Ling, Carlsbad, CA (US); Sridhar Ramesh, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 839 days.

(21) Appl. No.: 14/245,658

(22) Filed: Apr. 4, 2014

(65) Prior Publication Data

US 2014/0313074 A1 Oct. 23, 2014

Related U.S. Application Data

(60) Provisional application No. 61/808,405, filed on Apr. 4, 2013.

(51) Int. Cl.
*H04B 7/185* (2006.01)
*H04B 7/00* (2006.01)

(52) U.S. Cl.
CPC ................................ *H04B 7/18523* (2013.01)

(58) Field of Classification Search
CPC . H04B 7/14; H04B 7/15; H04B 7/185; H04B 7/18523; G01S 3/02; G01S 3/14; G01S 3/16; G01S 19/01; G01S 19/13; G01S 19/21; H01Q 3/26; H01Q 3/2605; H01Q 3/2611; H01Q 3/2617; H01Q 3/02
See application file for complete search history.

(56) References Cited

U.S. PATENT DOCUMENTS

| | | | | |
|---|---|---|---|---|
| 4,791,428 A | * | 12/1988 | Anderson | H01Q 3/02 343/757 |
| 5,990,831 A | * | 11/1999 | McDowell | H01Q 3/2611 342/17 |
| 6,084,540 A | * | 7/2000 | Yu | H01Q 3/2611 342/13 |
| 7,783,246 B2 | * | 8/2010 | Twitchell, Jr. | G01S 19/21 342/357.4 |

* cited by examiner

*Primary Examiner* — Bernarr E Gregory
(74) *Attorney, Agent, or Firm* — McAndrews, Held & Malloy

(57) ABSTRACT

A direct broadcast satellite (DBS) reception assembly may receive a desired satellite signal and process the desired satellite signal for output to a gateway. The DBS assembly may also receive one or more undesired satellite signals and determine a performance metric of the one or more undesired satellite signals. The elevation angle of the assembly and/or the azimuth angle of the assembly may be adjusted based on the performance metric(s) of the undesired satellite signal(s). The adjusting of the elevation angle and/or the azimuth angle may comprise electronically steering a directivity of a receive radiation pattern of the DBS reception assembly and/or mechanically steering one or more components of the assembly via motors, servos, actuators, MEMS, and/or the like. The performance metric may be received signal strength of the undesired signals, received signal strength of the desired signal, SNR of the desired signal, and/or SNR of the undesired signals.

20 Claims, 5 Drawing Sheets

SATELLITE RECEPTION ASSEMBLY INSTALLATION AND MAINTENANCE

PRIORITY CLAIM

This application claims priority to the following application(s), each of which is hereby incorporated herein by reference:
U.S. provisional patent application 61/808,405 titled "Satellite Dish Installation and Maintenance" filed on Apr. 4, 2013.

INCORPORATION BY REFERENCE

The entirety of each of the following applications is hereby incorporated herein by reference:
U.S. patent application Ser. No. 14/157,028 titled "Satellite Reception Assembly with Phased Horn Array" filed on Jan. 16, 2014.

BACKGROUND OF THE INVENTION

A satellite television system may comprise a low noise block downconverter (LNB) which is generally co-located with a satellite reception assembly (e.g., a "dish") in the satellite television system. The conventional LNB may be operable to amplify a received radio frequency (RF) satellite signal and convert such signal to lower frequencies such as, for example, intermediate frequencies (IF). Presently, satellite television systems have become ubiquitous, primarily due to reductions in the cost of satellite television reception technology. A plurality of satellite television systems may be in a neighborhood.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for an Internet protocol LNB supporting sensors, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
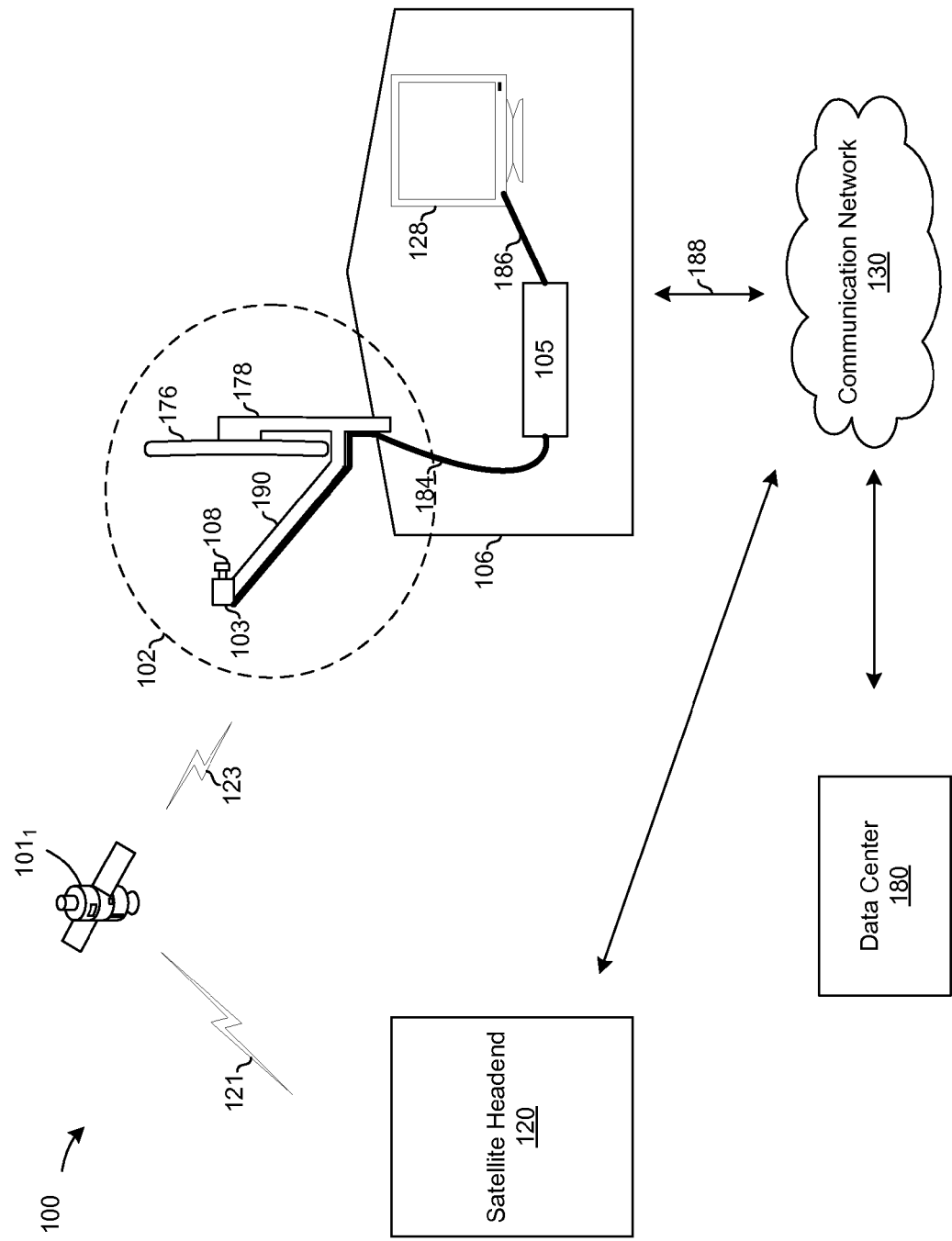
FIG. 1 is a block diagram illustrating an exemplary communication system, in accordance with an embodiment of the invention.

FIG. 1 is a block diagram illustrating an exemplary communication system, in accordance with an embodiment of the invention. Referring to FIG. 1, there is shown a communication system 100. The communication system 100 comprises a satellite 101$_1$, a satellite headend 120, a communication network 130, a data center 180, and customer premises 106. The premises 106 may be, for example, a house, multi-dwelling unit, or office. The premises 106 comprises a satellite reception assembly 102 and a gateway 105.

In the example implementation depicted, the satellite reception assembly 102 comprises a parabolic reflector 176 and a subassembly 103 mounted (e.g., bolted or welded) to a support structure 178 which, in turn, comprises a boom 190 and attaches (e.g., via bolts) to the premises 106 (e.g., to the roof). At least a portion of the subassembly 103 may be mounted at or near the focal point of the reflector 176. The subassembly 103 may comprise one or more antennas 108 and circuitry for processing signals received via the antenna(s), as described below with reference to FIG. 4. The antenna(s) 108 may comprise a plurality of fixed feed horns as in a conventional DBS reception assembly. Alternatively, the antenna(s) 108 may comprise a phased-array of feed horns or planar antenna elements. An example implementation of the subassembly 103 is described below with reference to FIG. 4.

The gateway 105 is operable to receive data (e.g., television content, data from the Internet, etc.) from the satellite reception assembly 102 via cable(s) 184. The gateway 105 may transmit data onto and receive data from the WAN 130 via broadband connection 188. The gateway 105 may transmit data to and receive data from user equipment 128 (e.g., a television, speakers, computer, and/or the like) via connections 186 (e.g., point-to-point audio and/or video connections such as HDMI and/or IP-based connections such as Ethernet).

The satellite headend 120 comprises circuitry operable to communicate data to satellite $101_1$ via uplink 121. Such data may include data for configuring/controlling the satellite $101_1$ and content which is retransmitted on the downlink 123 for reception by assemblies such as 102

The data center 180 comprises circuitry operable to store and communicate data to and from assembly 102 via the gateway 105, for example. The data may include, for example, information about signal reception by the assembly (e.g., performance metrics such as signal-to-noise ratio for one or more frequency bands) and/or information about a configuration (e.g., azimuth and/or elevation angles or other metrics characterizing an alignment of the assembly) The data center 180 may process and/or aggregate the data from multiple assemblies. The aggregated data may be analyzed and used for configuring one or more satellite assemblies such as 102 (e.g., sending instructions for particular assemblies to change their alignment) and/or for configuring the satellite $101_1$.

The communication network 130 comprises circuitry operable to provide wide area network (WAN) services via various communication technologies such as, for example, DOCSIS, DSL, Carrier Ethernet, ATM, Frame Relay, ISDN, x.25 and/or other suitable WN technology. For example, the communication network 130 may provide access to the Internet.

In operation, the satellite reception assembly 102 may be operable to dynamically autonomously align itself using electromechanical adjustment of the physical alignment of the assembly 102 (e.g., as described below with reference to FIG. 2A) and/or electronic steering of the receive pattern of the assembly 102 (e.g., as described below with reference to FIG. 2B). In this manner, the satellite reception assembly 102 may be operable to automatically compensate for misalignment during installation, due to wind, due to vibration, and/or the like.

Figure 2B:
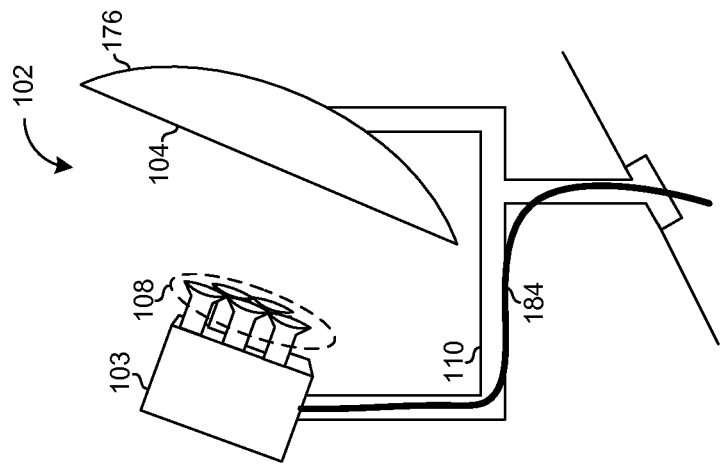
FIG. 2B shows an example satellite reception assembly configured for alignment using beamforming.
Figure 2A:
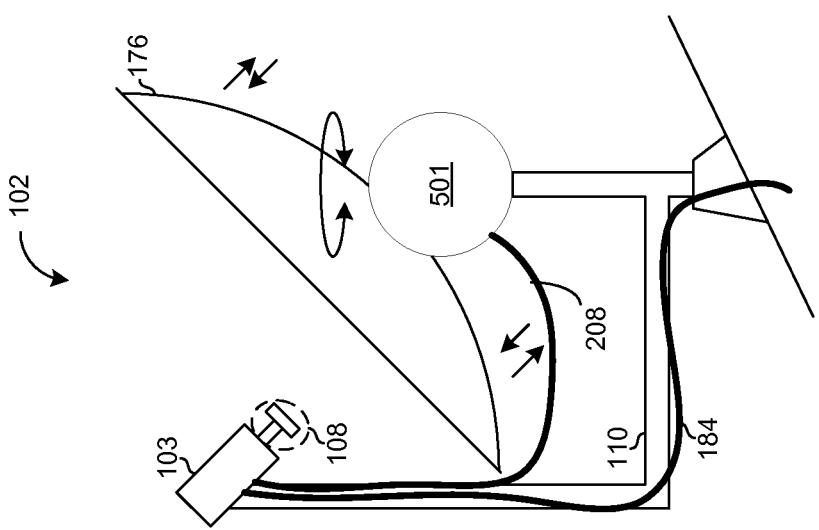
FIG. 2A shows an example satellite reception assembly configured for mechanical alignment.

FIG. 2A shows an example satellite reception assembly configured for mechanical alignment. The example satellite reception assembly 102 in FIG. 2A comprises the subassembly 103, antenna(s) 108, reflector 176, support structure 110, and cable 184 previously discussed. The example satellite reception assembly 102 in FIG. 2A also comprises mechanical alignment assembly 501.

The mechanical alignment subassembly 501 may comprise, for example, first one or more first motors, servos, actuators, microelectromechanical systems, or the like for controlling azimuth angle of the satellite reception assembly 102 motor, and one or more second motors, servos, actuators, or the like for controlling elevation angle of the satellite reception assembly 102. The example mechanical alignment subassembly 501 is controlled by circuitry in the signal processing subassembly 103 via cable 208. Generation of the signals for adjusting the alignment may be as described below with reference to FIGS. 3A-5.

FIG. 2B shows an example satellite reception assembly configured for alignment using beamforming. The example satellite reception assembly 102 in FIG. 2B comprises the subassembly 103, antenna(s) 108, reflector 176, support structure 110, and cable 184 previously discussed. Explicitly shown in FIG. 2B, however, is that the antenna(s) 108 may comprise a one or two-dimensional array of antenna elements (e.g., feed horns, microstrip patches, and/or the like) for creating an antenna pattern having one or more beams the directivity of which is/are dynamically adjustable during operation of the satellite reception assembly 102. Example details of such a satellite reception assembly are provided in the above-incorporated U.S. patent application Ser. No. 14/157,028.

Figure 3B:
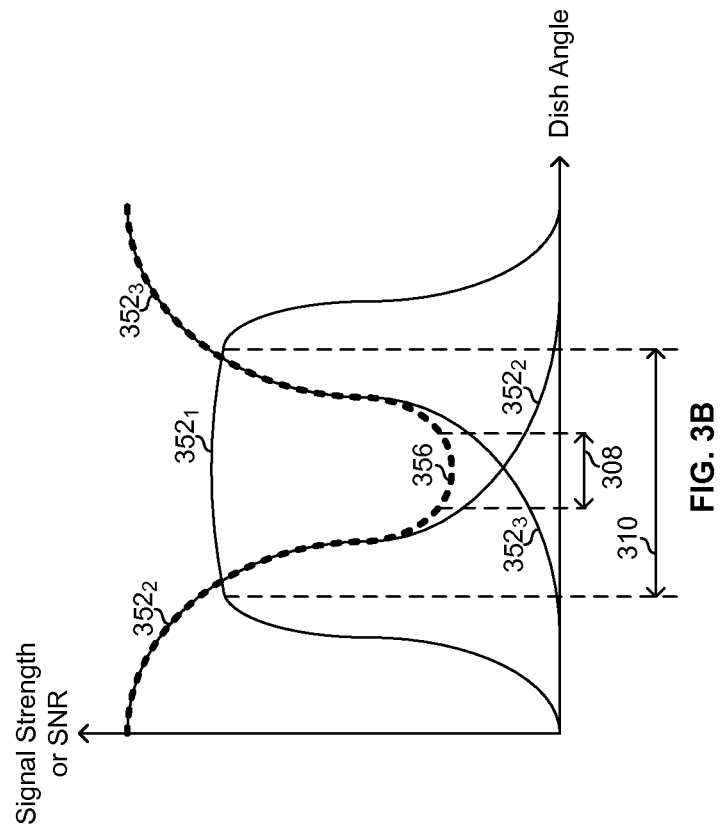
FIG. 3B shows a graph of a performance metric for the satellite signals of FIG. 3A.
Figure 3A:
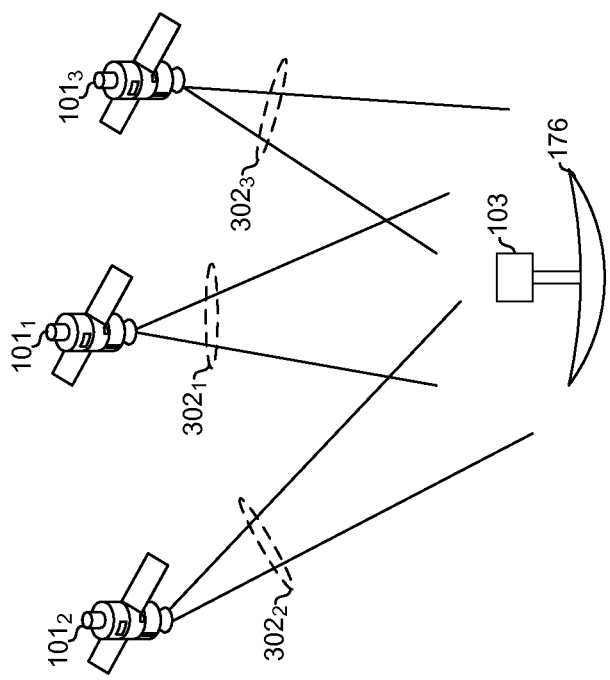
FIG. 3A shows an example satellite reception assembly on which beams from three satellites are incident.

FIG. 3A shows an example satellite reception assembly on which beams from three satellites are incident. Shown again is the DBS satellite $101_1$ along with two other DBS satellites $101_2$ and $101_3$. The three satellites $101_1$-$101_3$ may reside, for example, in three adjacent orbital slots (e.g., $101_1$ may be separated from $101_2$ by approximately −3° and from $101_3$ by approximately +3°). The satellite $101_1$ is transmitting signal $302_1$, the satellite $101_2$ is transmitting signal $302_2$ and the satellite $101_3$ is transmitting signal $302_3$. For purposes of illustration, it is assumed that it is desired for the satellite reception assembly 102 to receive the signal $302_1$ (e.g., because a gateway 105 is requesting content carried in signal $302_1$) and that the signals $302_2$ and $302_3$ are undesired signals (e.g., because no gateway 105 connected to the assembly 102 is requesting data carried in signals $302_2$ and $302_3$).

In another implementation, the reflector 176 may be formed to have multiple focal points, and the subassembly 103 may comprise multiple antennas (or antenna arrays) 108, each positioned at a corresponding focal point. For example, in FIG. 3 the reflector 176 may have three focal points and the assembly 103 may comprise three steerable arrays 108, each of which is at a respective one of the three focal points. In such an implementation, the optimal alignment may be determined by looking at the received signal strength of all three desired signals simultaneously via the three antennas/antenna arrays.

FIG. 3B shows a graph of a performance metric for the satellite signals of FIG. 3A. In FIG. 3B the Y axis corresponds to the performance metric (e.g., received signal strength or signal-to-noise ratio) and the X axis corresponds to angle of the satellite reception assembly. For clarity and simplicity of illustration, a two-dimensional line graph representing only one of the two angles (azimuth and elevation) is presented, however the same concepts apply for a three-dimensional surface graph with the Z axis corresponding to the other of the two angles. The lightweight solid line $352_1$ corresponds to the performance metric for the desired signal $302_1$. The lightweight solid line $352_2$ corresponds to the performance metric for the undesired signal $302_2$. The lightweight solid line $352_3$ corresponds to the performance metric for the undesired signal $302_3$. The heavy dashed line 356 corresponds to the sum of the two lines $352_2$ and $352_3$.

In an example implementation, the measured or estimated performance metric of undesired signal(s) may be used for aligning/tuning the satellite reception assembly 102 instead of, or in addition to, using a measured or estimated performance metric for desired signal(s).

Use of the performance metric of the undesired signals instead of the performance metric of the desired signal may improve alignment/tuning because the peak of the performance metric for the desired signal may be relatively flat over a relatively broad range of azimuth and/or elevation angles, whereas the performance metric of the undesired signals may increase/decrease rapidly over small angular changes.

Use of the performance metric of the undesired signals in combination with the performance metric of the desired signal may improve alignment/tuning because the peak of the performance metric for the desired signals may occur at a first combination of elevation and/or azimuth and the null of the combined interference may occur at a second combination of elevation and/or azimuth. Accordingly, there may be some combination of azimuth and elevation that is an optimal compromise between the first combination and second combination.

In FIG. 3B, for example, the maximum of line $352_1$ (within the resolution of the circuitry performing the measurement or estimation) spans the range of angles indicated as 310 whereas the minimum of line 356 (within the resolution of the circuitry performing the measurement or estimation) spans only 308, where 308<310. Accordingly, aligning based on a seeking of the minimum of 356 (instead of or in addition to seeking the maximum of $352_1$) may provide an alignment of the satellite reception assembly 102 that maximizes (within tolerances) the signal-to-noise ratio of the desired signal $352_1$. An example method for aligning the satellite reception assembly 102 based on the performance metric(s) is described below with reference to FIG. 5.

Figure 4:
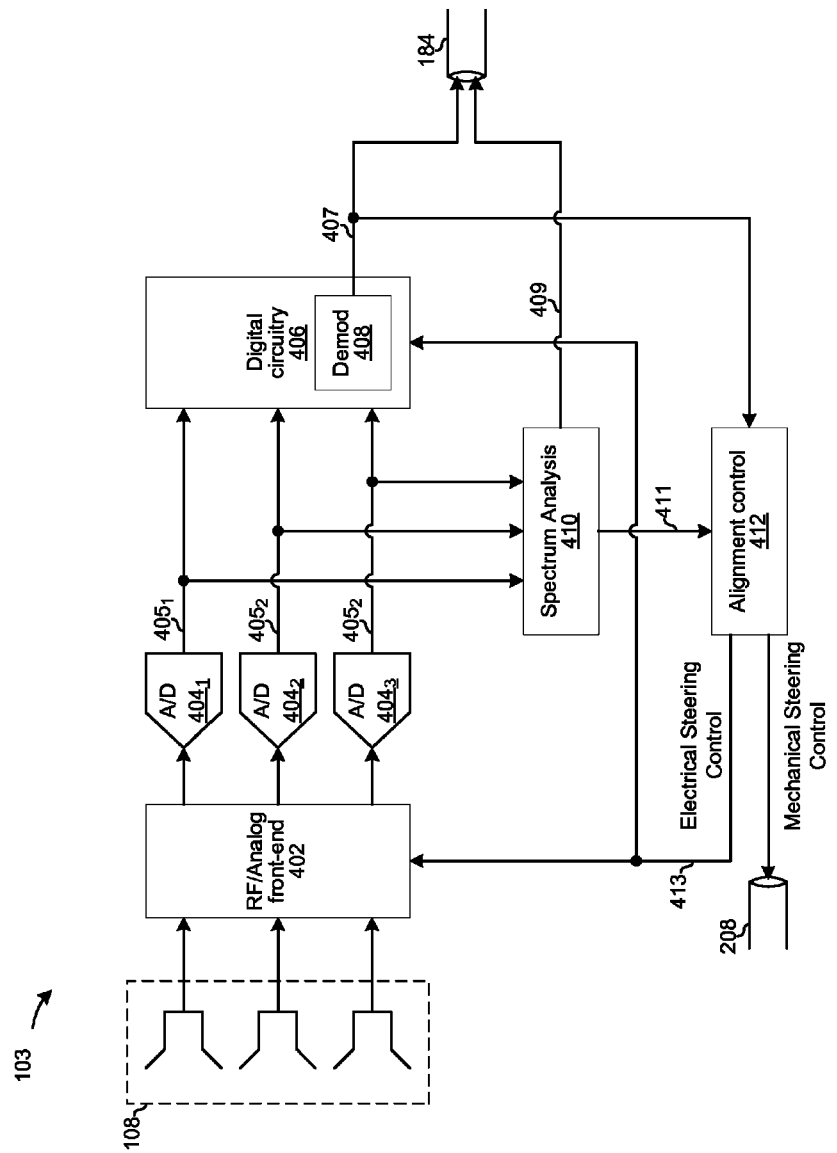
FIG. 4 shows example circuitry of a signal processing subassembly operable to perform alignment based on received signal characteristics.

Shown in FIG. 4 is example circuitry of a signal processing subassembly operable to perform alignment based on received signal characteristics. The example subassembly 103 comprises feedhorn(s) 108, RF/Analog front-end circuitry 402, analog-to-digital converters (ADCs) $404_1$-$404_3$, digital circuitry 406, spectrum analysis circuitry 410, and alignment control circuitry 412.

The front-end 402 is operable to perform RF/analog domain processing of signals captured by the antenna(s) 108. Such processing may include, for example, amplifying, downconverting, and filtering. In an example implementation, the downconversion may be from K-band to L-band. Where the antenna(s) 108 are a phased array, associated signal processing (signal phasing and/or gain control) for controlling the directivity of one or more lobes of the radiation pattern may be performed in RF/analog circuitry 402.

The digital circuitry 406 is operable to perform digital processing of the digitized signals output by the ADCs $404_1$-$404_3$. Such processing may include, for example, interference cancellation, I/Q phase/frequency calibration, channelization (i.e., channel-select filtering), multiplexing of channels and/or bands (i.e., "channel stacking" and/or "band stacking), and/or the like. Where the antenna(s) 108 are a phased array, associated signal processing (signal phasing and/or gain control) for controlling the directivity of one or more lobes of the radiation pattern may be performed in the digital circuitry 406.

Each of the ADCs $404_1$-$404_3$ is operable to digitize a respective one of a plurality of signals output by circuitry 402. In an example implementation, each ADC 404 may be operable to concurrently digitize the entirety of a ~1 GHz wide L-band signal output by circuitry 402. For example, each of the ADCs 404 may be operable to digitize the entire bandwidth of a respective one of the satellite signals $302_1$, $302_2$, and $302_3$ and output a respective one of signals $405_1$, $405_2$, and $405_3$.

The circuitry 410 is operable to process the signals $405_1$-$405_3$ (corresponding to signals $302_1$-$302_3$, respectively) to determine one or more performance metrics (e.g., received signal strength, signal-to-noise ratio, and/or the like) for each of the signals. The circuitry 410 is also operable to provide the performance metric(s) to the alignment control circuitry as signal 411.

In an example implementation, the circuitry 410 may also be operable to output the performance metric(s) and/or other test and/or calibration data as signal 409. This data may, for example, be provided to the gateway 105 (via cable 184) and may be used by a technician during installation. This data may also be provided to the satellite service provider that operates the satellites 101 (e.g., via the gateway 105 and the Internet). Additionally or alternatively, this data may be output to a test/calibration interface (e.g., to which a technician may connect a terminal).

In an example implementation, the circuitry 410 may be operable to estimate signal-to-noise ratio of the desired signal $405_1$ by digitizing the full spectrum of the desired satellite beam, performing a fast Fourier transform (FFT), and then calculating SNR based on the noise level in the guard band(s). Additionally or alternatively, the SNR may measure directly via a demodulator integrated in the subassembly 103. That is, the digital circuitry 406 may comprise a demodulator 408 operable to demodulate one or more of the signals $405_1$-$405_3$ and measure signal-to-noise ratio of one or more of the $405_1$-$405_3$ using the demodulated signals.

Figure 5:
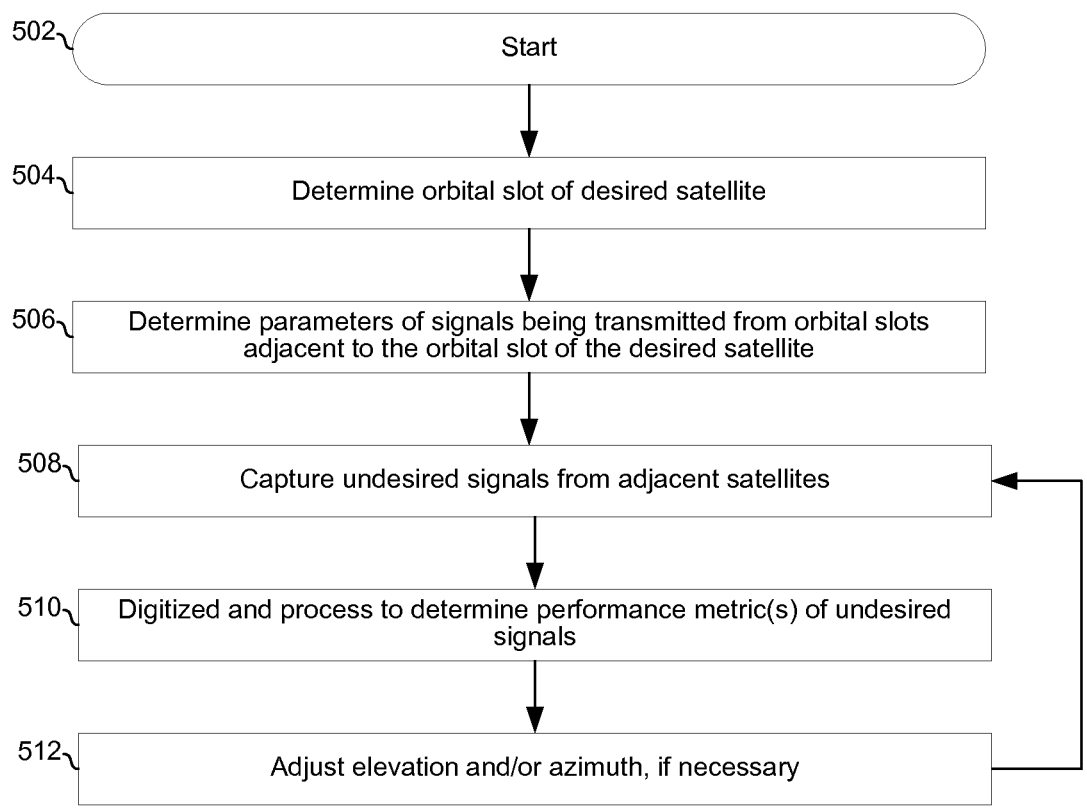
FIG. 5 is a flowchart illustrating an example process for aligning a satellite reception assembly based on received signal characteristics.

FIG. 5 is a flowchart illustrating an example process for aligning a satellite reception assembly based on received signal characteristics. The process begins in block 502 and proceeds to block 504. In block 504, the signal processing subassembly 103 determines an orbital slot of the desired satellite. This may be determined, for example, based on geographical coordinates, input from a technician, and/or the like. In block 506, the signal processing subassembly 103 determines operating parameters (e.g., frequency, polarization, etc.) of undesired signals being transmitted by satellites that are in orbital slots adjacent to the orbital slot of the desired satellite. This may be done, for example, using a lookup table of satellites and their parameters. In block 508, the satellite reception assembly 102 captures energy of the undesired signals from the satellites in the adjacent orbital slots. In block 510, the undesired signals are digitized and processed (e.g., an FFT is performed on them followed by a frequency-domain analysis) to determine one or more performance metrics for the undesired signals. In block 512 the elevation angle and/or azimuth angle of the satellite reception assembly 102 may be adjusted, if necessary, based on the performance metric(s) of the undesired signals. The process then returns to block 508. The return to block 508 may be, for example, immediately for continuous alignment, after a period of time for periodic alignment, or in response to a particular event for event-driven alignment (e.g., a user entering a "re-align" command via the gateway 105).

In accordance with an example implementation of this disclosure, a direct broadcast satellite (DBS) reception assembly may receive a desired satellite signal, and process the desired satellite signal for output to a gateway. The DBS assembly may also receive one or more undesired satellite signal(s), and determine a performance metric of the one or more undesired satellite signal(s). The elevation angle of the DBS satellite reception assembly and/or the azimuth angle of the DBS satellite reception assembly may be adjusted based on the performance metric(s) of the one or more undesired satellite signal(s). The adjusting of the elevation angle and/or the azimuth angle may comprise electronically steering a directivity of a receive radiation pattern of the DBS reception assembly. The DBS reception assembly may comprise one or more electromechanical systems (e.g., motor, servo, actuator, and/or the like), and the adjusting may comprise mechanically steering the DBS reception assembly using the electromechanical system(s). The performance metric may be received signal strength of the undesired signal(s), received signal strength of the desired signal, signal-to-noise ratio of the desired signal, or signal-to-noise ratio of the undesired signal(s). The circuitry of the DBS reception assembly may comprise one or more demodulator(s) (e.g., 408) and may demodulate the one or more undesired signal(s) via the one or more demodulator(s) to generate one or more demodulated signal(s). The demodulated signal(s) may enable direct measurement of the signal-to-noise ratio of the undesired signal(s).

The desired signal may be in a first frequency band (e.g., first chunk in the Ka or Ku band) and each of the one or more undesired signal(s) is in a respective one of one or more second frequency bands (each in a respective second chunk of the Ka or Ku band). The circuitry may determine the signal-to-noise ratio of the desired signal. Such a determination may comprise digitizing a block of frequencies encompassing the first frequency band and the one or more second frequency band(s), performing a fast Fourier transform on the digitized block of frequencies, and measuring signal strength in one or more guard band(s) between the first frequency band and the one or more second frequency band(s).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a direct broadcast satellite (DBS) reception assembly:
receiving a desired satellite signal;
processing said desired satellite signal for output to a gateway;
receiving one or more undesired satellite signals;
determining a performance metric of said one or more undesired satellite signals; and
adjusting an elevation angle of said DBS reception assembly and/or azimuth angle of said DBS reception assembly based on said performance metric of said one or more undesired satellite signals.

2. The method of claim 1, wherein said adjusting said elevation angle and/or said azimuth angle comprises electronically steering a directivity of a receive radiation pattern of said DBS reception assembly.

3. The method of claim 1, wherein said DBS reception assembly comprises one or more electromechanical systems, and said adjusting performed mechanically via said one or more electromechanical systems.

4. The method of claim 1, wherein said performance metric is received signal strength.

5. The method of claim 4, comprising, during said adjusting, seeking a value of said azimuth angle and/or a value of said elevation angle that corresponds to a minimum of said received signal strength.

6. The method of claim 1, wherein said performance metric is signal-to-noise ratio.

7. The method of claim 6, comprising:
demodulating said one or more undesired signals via one or more demodulators of said DBS reception assembly, said demodulating resulting in one or more demodulated undesired signals; and
determining said signal-noise-ratio based on said one or more demodulated undesired signals.

8. The method of claim 1, comprising:
determining a performance metric of said desired satellite signal; and
adjusting said elevation angle and/or said azimuth angle based on said signal strength of said desired signal.

9. The method of claim 8, wherein:
said desired satellite signal is in a first frequency band;
each of said one or more undesired signals is in a respective one of one or more second frequency bands;
said performance metric of said desired signal is signal-to-noise ratio; and
said determining said signal-to-noise ratio comprises:
digitizing a block of frequencies encompassing said first frequency band and said one or more second frequency bands;
performing a fast Fourier transform on said digitized block of frequencies; and
measuring signal strength in one or more guard bands between said first frequency band and said one or more second frequency bands.

10. The method of claim 1, wherein said desired signal emanates from a first satellite in a first orbital slot, and said one or more undesired signals emanate from one or more second satellites in a corresponding one or more second orbital slots adjacent to said first orbital slot.

11. A system, comprising:
circuitry for use in a direct broadcast satellite (DBS) reception assembly, wherein said circuitry is operable to:
receive a desired satellite signal;
process said desired satellite signal for output to a gateway;
receive one or more undesired satellite signals;
determine a performance metric of said one or more undesired satellite signals; and
adjust an elevation angle of said DBS reception assembly and/or azimuth angle of said DBS reception assembly based on said performance metric of said one or more undesired satellite signals.

12. The system of claim 11, wherein said DBS reception assembly comprises circuitry and an array of antennas operable to adjust a directivity of a receive radiation pattern of said DBS reception assembly during reception of said desired signal and said one or more undesired signals.

13. The system of claim 11, wherein said DBS reception assembly comprises one or more electromechanical systems, and said adjustment is performed mechanically via said one or more electromechanical systems.

14. The system of claim 11, wherein said performance metric is received signal strength.

15. The system of claim 14, wherein said circuitry is operable to, during said adjustment, seek a value of said azimuth angle and/or a value of said elevation angle that corresponds to a minimum of said received signal strength.

16. The system of claim 11, wherein said performance metric is signal-to-noise ratio.

17. The system of claim 16, wherein said circuitry is operable to:
   demodulate said one or more undesired signals via one or more demodulators of said DBS reception assembly, said demodulation resulting in one or more demodulated undesired signals; and
   determine said signal-noise-ratio based on said one or more demodulated undesired signals.

18. The system of claim 11, wherein said circuitry is operable to:
   determine a performance metric of said desired satellite signal; and
   adjust said elevation angle and/or said azimuth angle based on said signal strength of said desired signal.

19. The system of claim 18, wherein:
said desired satellite signal is in a first frequency band;
each of said one or more undesired signals is in a respective one of one or more second frequency bands;
said performance metric of said desired signal is signal-to-noise ratio; and
said determination of said signal-to-noise ratio comprises:
   digitization a block of frequencies encompassing said first frequency band and said one or more second frequency bands;
   performing a fast Fourier transform on said digitized block of frequencies; and
   measuring signal strength in one or more guard bands between said first frequency band and said one or more second frequency bands.

20. The system of claim 11, wherein said desired signal emanates from a first satellite in a first orbital slot, and said one or more undesired signals emanate from one or more second satellites in a corresponding one or more second orbital slots adjacent to said first orbital slot.

* * * * *